(12) United States Patent
Lee et al.

(10) Patent No.: US 11,811,932 B2
(45) Date of Patent: Nov. 7, 2023

(54) USING SIGNED TOKENS TO VERIFY SHORT MESSAGE SERVICE (SMS) MESSAGE BODIES

(71) Applicant: Proofpoint, Inc., Sunnyvale, CA (US)

(72) Inventors: Thomas Lee, Kensington, CA (US); Kevin San Diego, San Rafael, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 237 days.

(21) Appl. No.: 17/491,771

(22) Filed: Oct. 1, 2021

(65) Prior Publication Data

US 2022/0131697 A1     Apr. 28, 2022

Related U.S. Application Data

(60) Provisional application No. 63/105,608, filed on Oct. 26, 2020.

(51) Int. Cl.
*H04L 9/32*     (2006.01)
*H04L 9/30*     (2006.01)
*H04L 9/40*     (2022.01)
*H04L 51/42*     (2022.01)

(52) U.S. Cl.
CPC .......... *H04L 9/3213* (2013.01); *H04L 9/3073* (2013.01); *H04L 9/3242* (2013.01); *H04L 51/42* (2022.05); *H04L 63/0428* (2013.01)

(58) Field of Classification Search
CPC ... H04L 9/3213; H04L 9/3073; H04L 9/3242; H04L 51/42; H04L 63/0428
USPC ........................................................ 713/159
See application file for complete search history.

(56) References Cited

U.S. PATENT DOCUMENTS

| 8,150,430 B2 * | 4/2012 | Sennett | H04L 51/42 |
| | | | 707/758 |
| 8,380,989 B2 * | 2/2013 | Sarmah | H04W 12/06 |
| | | | 713/168 |
| 8,489,075 B2 * | 7/2013 | Shaw | H04M 3/53333 |
| | | | 379/88.13 |

(Continued)

FOREIGN PATENT DOCUMENTS

| CN | 101247605 A | 8/2008 |
| CN | 101895847 A | 11/2010 |
| WO | 2010057405 A1 | 5/2010 |

OTHER PUBLICATIONS

Feb. 2, 20225—(EP) Extended Search Report—App 21203819.4.

*Primary Examiner* — Amare F Tabor
(74) *Attorney, Agent, or Firm* — Banner & Witcoff, Ltd.

(57) ABSTRACT

Aspects of the disclosure relate to message verification. A computing platform may generate a cryptographic key pair comprising a public key and a private key. The computing platform may publish, to a server, the public key. The computing platform may generate a short message service (SMS) message. The computing platform may sign, using the private key, the SMS message, which may include computing a cryptographic hash of the SMS message using the private key and embedding the cryptographic hash in an SMPP field of the SMS message. The computing platform may send, to a downstream computing system, the signed SMS message, where the downstream computing system may be configured to validate the signed SMS message using the cryptographic hash embedded in the SMPP field of the SMS message and by accessing the public key.

20 Claims, 8 Drawing Sheets

(56) References Cited

U.S. PATENT DOCUMENTS

| | | | | |
|---|---|---|---|---|
| 8,868,661 | B2* | 10/2014 | Asawa | H04L 51/226 |
| | | | | 709/206 |
| 9,172,821 | B2* | 10/2015 | Smith | H04L 63/105 |
| 9,240,989 | B2* | 1/2016 | Chastain | H04L 63/0471 |
| 9,338,597 | B2* | 5/2016 | Abu-Hakima | H04W 4/021 |
| 9,515,976 | B2* | 12/2016 | Talwar | H04L 51/23 |
| 9,635,057 | B2* | 4/2017 | Bone | H04L 9/0861 |
| 10,069,845 | B2* | 9/2018 | Steinbach | H04L 63/0876 |
| 10,630,665 | B2 | 4/2020 | Chen et al. | |
| 11,202,180 | B2* | 12/2021 | Polychronidis | H04W 4/12 |
| 2018/0097756 | A1* | 4/2018 | Lew | G06Q 30/01 |
| 2018/0367511 | A1* | 12/2018 | Chichibu | H04L 63/0428 |

\* cited by examiner

USING SIGNED TOKENS TO VERIFY SHORT MESSAGE SERVICE (SMS) MESSAGE BODIES

CROSS-REFERENCE TO RELATED APPLICATIONS

This application claims the benefit of and priority to U.S. Provisional Patent Application Ser. No. 63/105,608, filed Oct. 26, 2020, and entitled "DKIM Sign/Verify SMS Message Bodies," which is incorporated by reference herein in its entirety.

TECHNICAL FIELD

Aspects of the disclosure relate to electronic messaging, and communication systems and networks. In particular, one or more aspects of the disclosure relate to using signed tokens to verify short message service (SMS) message bodies.

BACKGROUND

Individuals and organizations face increasing and evolving security and/or data integrity risks in the transmission and/or receipt of text messages. For example, text messages may be modified and/or otherwise corrupted in transmission by malicious actors and errors introduced by processing systems. This may create undetected security or data integrity threats that leave individuals and/or organizations vulnerable to cyberattacks, attempts at unauthorized access to secured systems and information, and/or manipulation of proprietary or confidential information.

SUMMARY

Aspects of the disclosure provide technical solutions that overcome one or more of the technical problems described above and/or other technical challenges. For instance, one or more aspects of the disclosure relate to using signed tokens to verify short message service (SMS) message bodies.

In accordance with one or more embodiments, a computing platform having at least one processor, a communication interface, and memory may generate a cryptographic key pair comprising a public key and a private key. The computing platform may publish, to a server, the public key. The computing platform may generate a short message service (SMS) message. The computing platform may sign, using the private key, the SMS message, which may include computing a cryptographic hash of the SMS message using the private key and embedding the cryptographic hash in an SMPP field of the SMS message. The computing platform may send, to a downstream computing system, the signed SMS message, where the downstream computing system is configured to validate the signed SMS message using the cryptographic hash embedded in the SMPP field of the SMS message and by accessing the public key from an internet Domain Name Service (DNS) server of a domain indicated by the computing platform.

In one or more instances, signing the SMS message may cause message metadata to indicate retrieval information for the public key. In one or more instances, the server may be a DNS server.

In one or more instances, the computing platform may locally store the private key and/or upload, to a Communications Platform as a Service (CPaaS) platform, the private key, and the private key may be stored at the CPaaS platform. In one or more instances, signing the SMS message may include signing the SMS message at one of: the computing platform or the CPaaS platform.

In one or more instances, the computing platform may compute the cryptographic hash of the SMS message by hashing one or more of: contents of the SMS message or sender information. In one or more instances, the SMPP field may be a custom SMPP tagged link value (TLV).

In one or more instances, the SMS message may be additionally signed by an upstream intercarrier computing system using another public-private key combination, and the downstream computing system may further verify the SMS message based on the upstream intercarrier computing system's signature. In verifying the complete SMS message, the downstream computing system may, for instance, verify all SMS message parts needed for a given message, post-concatenation, if applicable. In one or more instances, the computing platform may receive, from the downstream computing system, a message indicating that a problem occurred with signature validation for the SMS message.

In one or more instances, the message indicating that a problem occurred with signature validation for the SMS message may indicate that the problem is one or more of: a message payload modification, a message payload corruption, or an issue with truncation of payload for the SMS message during transit. In one or more instances, the computing platform may generate, based on receipt of the message indicating that the problem occurred with signature validation for the SMS message, an abuse reporting format (ARF) message, and the ARF message may include one or more policies indicating how downstream computing systems, including the downstream computing system, should handle messages that are unable to be validated. In one or more instances, generating the ARF message causes the computing platform to instruct the downstream computing systems to: deliver the invalid messages with a warning, quarantine the invalid messages, send the invalid message in a digest, and/or drop the invalid message.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

As a brief introduction to the concepts described further below, one or more aspects of the disclosure relate to systems and methods for signing and verifying SMS messages and/or other text messages. Using a signing approach similar to DomainKeys Identified Mail (DKIM) for email, an SMS message may be signed using a private key and a cryptographic hash may be embedded into an SMPP field of the message. A recipient can later validate the hash using a public key (which may, e.g., be stored on a DNS server). Furthermore, an abuse reporting format (ARF) may be provided to handle feedback for signed messages that cannot be validated downstream. For example, one or more policies may be published indicating how such messages should be handled downstream.

Figure 1:
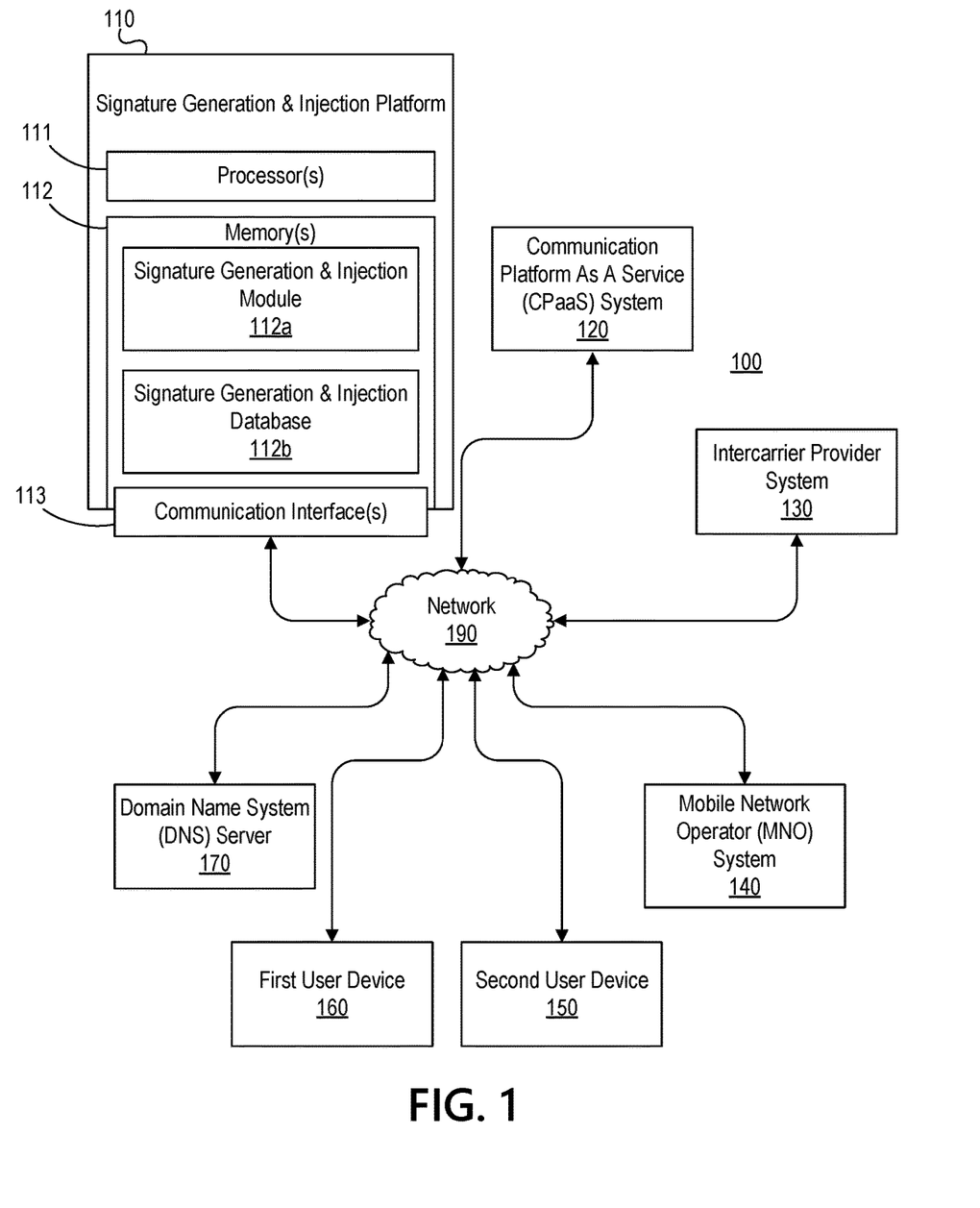
FIG. 1 depicts an illustrative operating environment for using signed tokens to verify SMS message bodies in accordance with one or more example embodiments.

FIG. 1 depicts an illustrative operating environment for using signed tokens to verify SMS message bodies in accordance with one or more example embodiments. Referring to FIG. 1, computing environment 100 may include various computer systems, computing devices, networks, and/or other operating infrastructure. For example, computing environment 100 may include a signature generation and injection platform 110, a communication platform as a service (CPaaS) system 120, an intercarrier provider system 130, a mobile network operator (MNO) system 140, a second user device 150, a first user device 160, a domain name system (DNS) server 170, and a network 190. In some instances, the second user device 150 and the first user device 160 may be connected to the MNO system 140 via the network 190. In other instances, the second user device 150 and the first user device 160 may be connected to the network 190 via the MNO system 140 (e.g., connected to the MNO system 140, which may be connected to the network 190).

Network 190 may include one or more wired networks and/or one or more wireless networks that interconnect signature generation and injection platform 110, CPaaS system 120, intercarrier provider system 130, MNO system 140, second user device 150, first user device 160, DNS server 170 and/or other computer systems and/or devices. In addition, each of signature generation and injection platform 110, CPaaS system 120, intercarrier provider system 130, MNO system 140, second user device 150, first user device 160, DNS server 170, may be special purpose computing devices configured to perform specific functions, as illustrated in greater detail below, and may include specific computing components such as processors, memories, communication interfaces, and/or the like.

Signature generation and injection platform 110 may include one or more processor(s) 111, one or more memory(s) 112, and one or more communication interface(s) 113. In some instances, signature generation and injection platform 110 may be made up of a plurality of different computing devices, which may be distributed within a single data center or a plurality of different data centers. In these instances, the one or more processor(s) 111, one or more memory(s) 112, and one or more communication interface(s) 113 included in signature generation and injection platform 110 may be part of and/or otherwise associated with the different computing devices that form signature generation and injection platform 110.

In one or more arrangements, processor(s) 111 may control operations of signature generation and injection platform 110. Memory(s) 112 may store instructions that, when executed by processor(s) 111, cause signature generation and injection platform 110 to perform one or more functions, as discussed below. Communication interface(s) 113 may include one or more wired and/or wireless network interfaces, and communication interface(s) 113 may connect signature generation and injection platform 110 to one or more networks (e.g., network 190) and/or enable signature generation and injection platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause signature generation and injection platform 110 to perform various functions) and/or databases (which may, e.g., store data used by signature generation and injection platform 110 in performing various functions). For example, memory(s) 112 may store and/or otherwise provide signature generation and injection module 112a and signature generation and injection database 112b. In some instances, signature generation and injection module 112a may store instructions that cause signature generation and injection platform 110 to inject message signatures, generate Abuse Reporting Format (ARF) messages, and/or execute one or more other functions described herein. Additionally, signature generation and injection database 112b may store data that is used by signature generation and injection platform 110 for injection of message signatures, generation of ARF messages, and/or in executing one or more other functions described herein.

CPaaS system 120 may be and/or include one or more computing devices that may be configured to sign messages from the signature generation and injection platform 110. For example, in some instances, the CPaaS system 120 may sign messages on behalf of an organization at which the messages originated.

Intercarrier provider system 130 may be and/or include one or more computing devices that may be configured for message routing (e.g., to a MNO such as MNO system 140). In some instances, the intercarrier provider system 130 may be configured to sign text messages for validation purposes. For example, the intercarrier provider system 130 may be configured to sign text messages using a public-private key pair, prior to routing the text messages.

MNO system 140 may be and/or include one or more computing devices that may be configured to verify signed messages. For example, in some instances, the MNO system 140 may be configured to access a decryption key (e.g., a public or private key) that may be used to verify signed messages. The MNO system 140 may further be configured to route messages to user devices (e.g., first user device 160, second user device 150, and/or other user devices) upon verifying the messages. Additionally, the MNO system 140 may be configured to notify signature generation and injection platform 110 if a message is not verified. In some instances, the MNO system 140 may be configured to route messages to various user devices (e.g., first user device 160, second user device 150, and/or other user devices).

Second user device 150 may be configured to be used by a second user. For example, second user device 150 may be one of a mobile device, smartphone, tablet, laptop computer, desktop computer, and/or other device configured for electronic messaging. In some instances, second user device 150 may be configured to present one or more user interfaces (e.g., message interfaces, ARF feedback interfaces, and/or other interfaces).

First user device 160 may be configured to be used by a first user. For example, first user device 160 may be one of a mobile device, smartphone, tablet, laptop computer, desktop computer, and/or other device configured for electronic messaging. In some instances, first user device 160 may be configured to present one or more user interfaces (e.g., message interfaces, ARF feedback interfaces, and/or other interfaces).

DNS server 170 may be and/or include one or more computing devices (e.g., servers, server blades, or other devices) that may be configured for key storage. For example, in some instances, the DNS server 170 may be configured to receive a public key that may be used to sign and/or validate messages.

Figure 2A:
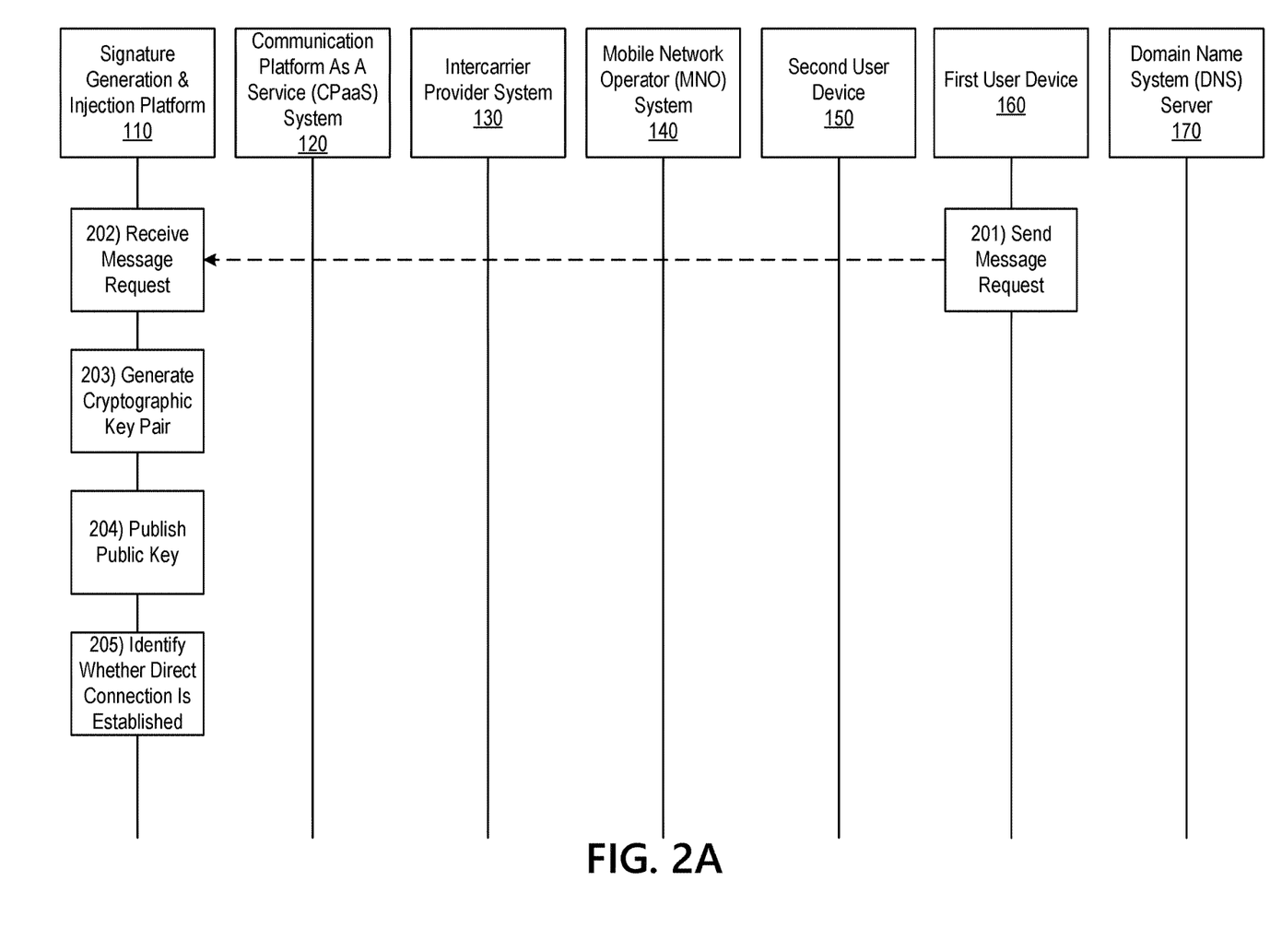
FIGS. 2A-2E depict an illustrative event sequence for using signed tokens to verify SMS message bodies in accordance with one or more example embodiments.

FIGS. 2A-2E depict an illustrative event sequence for using signed tokens to verify SMS message bodies in accordance with one or more example embodiments. Referring to FIG. 2A, at step 201, the first user device 160 may send a message send request to the signature generation and injection platform 110. For example, the first user device 160 may send a request to send an SMS or other text message to another device (e.g., second user device 150). In some instances, the message may include information such as a header, message body, sender information, recipient information, and/or other information.

At step 202, the signature generation and injection platform 110 may receive the message send request sent at step 201. For example, the signature generation and injection platform 110 may receive an SMS or other text message directed to another user device.

At step 203, the signature generation and injection platform 110 may generate a cryptographic key pair that may be used to verify the message. For example, the signature generation and injection platform 110 may generate a private signature key that may be used to sign the message, and a public key that may be used to verify the message. Although FIG. 2A illustrates generation of the cryptographic key pair after receipt of the message request at step 202, in some instances, the signature generation and injection platform 110 may generate the cryptographic key pair at any point prior to receipt of the message request (and/or sending of the message request or the depicted event sequence) without departing from the scope of the disclosure. In some instances, in generating the cryptographic key pair, the signature generation and injection platform 110 may generate keys that are valid for a period of time. In these instances, the signature generation and injection platform 110 may periodically rotate the cryptographic key pair (e.g., to a new cryptographic key pair) upon expiration of the period of time.

At step 204, the signature generation and injection platform 110 may publish the public key. For example, the signature generation and injection platform 110 may publish the public key to DNS server 170 (which may be publicly accessible) and/or another computing system that may be accessible for message verification by sending and/or otherwise transmitting the public key to DNS server 170. By publishing the public key in the above described ways, a low-cost, non-centralized public key infrastructure (PKI) may be implemented that leverages DNS for public key storage. In some instances, a location corresponding to the DNS server 170 may be included in signed messages (as described further below), which may enable access of the public key by downstream computing systems, and thus enabling validation of the signed messages using the public key.

At step 205, the signature generation and injection platform 110 may identify whether or not a direct connection is established with MNO system 140. If a direct connection is established with MNO system 140, the signature generation and injection platform 110 may proceed to step 206. Otherwise, if a direct connection is not established with MNO system 140, the signature generation and injection platform 110 may proceed to step 209.

Figure 2B:
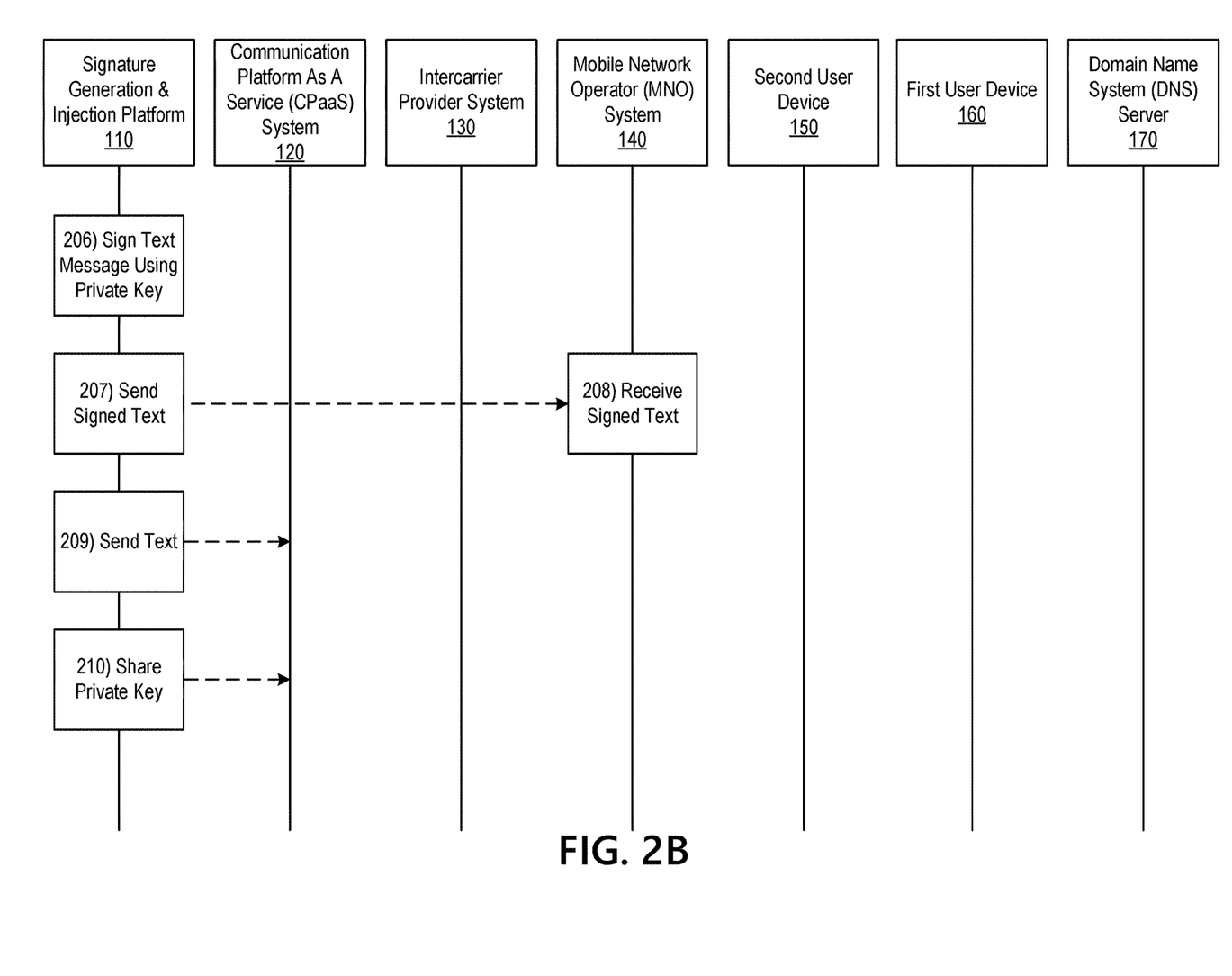

Referring to FIG. 2B, at step 206, the signature generation and injection platform 110 may sign the message using the private key (e.g., the private/signing key generated at step 203). For example, the signature generation and injection platform 110 may hash message contents, sender information, recipient information, and/or other message information. In some instances, in signing the message, the signature generation and injection platform 110 may embed metadata indicating ownership of the message, where to look up the public key for verifying the message, policy information indicating how the message should be handled if not validated, and/or other information. In some instances, in signing the message, the signature generation and injection platform 110 may embed the signature (and/or the private key itself) and/or a location of the public key in the metadata. For example, the signature generation and injection platform 110 may generate a cryptographic hash and stamp (or otherwise write) the hash into the message, prior to routing the message. In some instances, the signature generation and injection platform 110 may append this signature information to the message in one or more custom short message peer-to-peer (SMPP) fields (e.g., custom SMPP tagged link values (TLVs), or other fields). In some instances, in signing the message, the signature generation and injection platform 110 may sign the message on behalf of the message originating organization or individual (e.g., an individual or organization associated with the first user device 160). In some instances, the signature generation and injection platform 110 may sign the text message using a signed token. In doing so, the signature generation and injection platform 110 may enable the identification of message policies for various senders (e.g., positive or negative trust may be established for various senders based on results of signature validation). In some instances, in signing the text message, the signature generation and injection platform 110 may embed information such as an ARF feedback code (which may, e.g., indicate what feedback is requested), a reporting rate (which may, e.g., indicate a percentage of messages to sample), a reporting address (which may, e.g., indicate a destination to send reporting feedback), an indication of the signing entity, a message hash, and/or other information.

At step 207, the signature generation and injection platform 110 may send the signed text message to the MNO system. At step 208, the MNO system 140 may receive the signed text message from the signature generation and injection platform 110. The MNO system 140 may then proceed to step 217.

Returning to step 205, if a direct connection is not established with the MNO system 140, the signature generation and injection platform 110 may proceed to step 209 (e.g., as an alternative to performing steps 206 and 207). At step 209, the signature generation and injection platform 110 may send the text message to the CPaaS system 120. For example, the signature generation and injection platform 110 may send the text message to the CPaaS system 120 for signature (e.g., as an alternative to signing the text message at the signature generation and injection platform 110 itself).

At step 210, the signature generation and injection platform 110 may share the private/signing key with the CPaaS system 120. In doing so, the signature generation and injection platform 110 may enable the CPaaS system 120 to sign the text message on behalf of the message originating organization or individual.

Figure 2C:
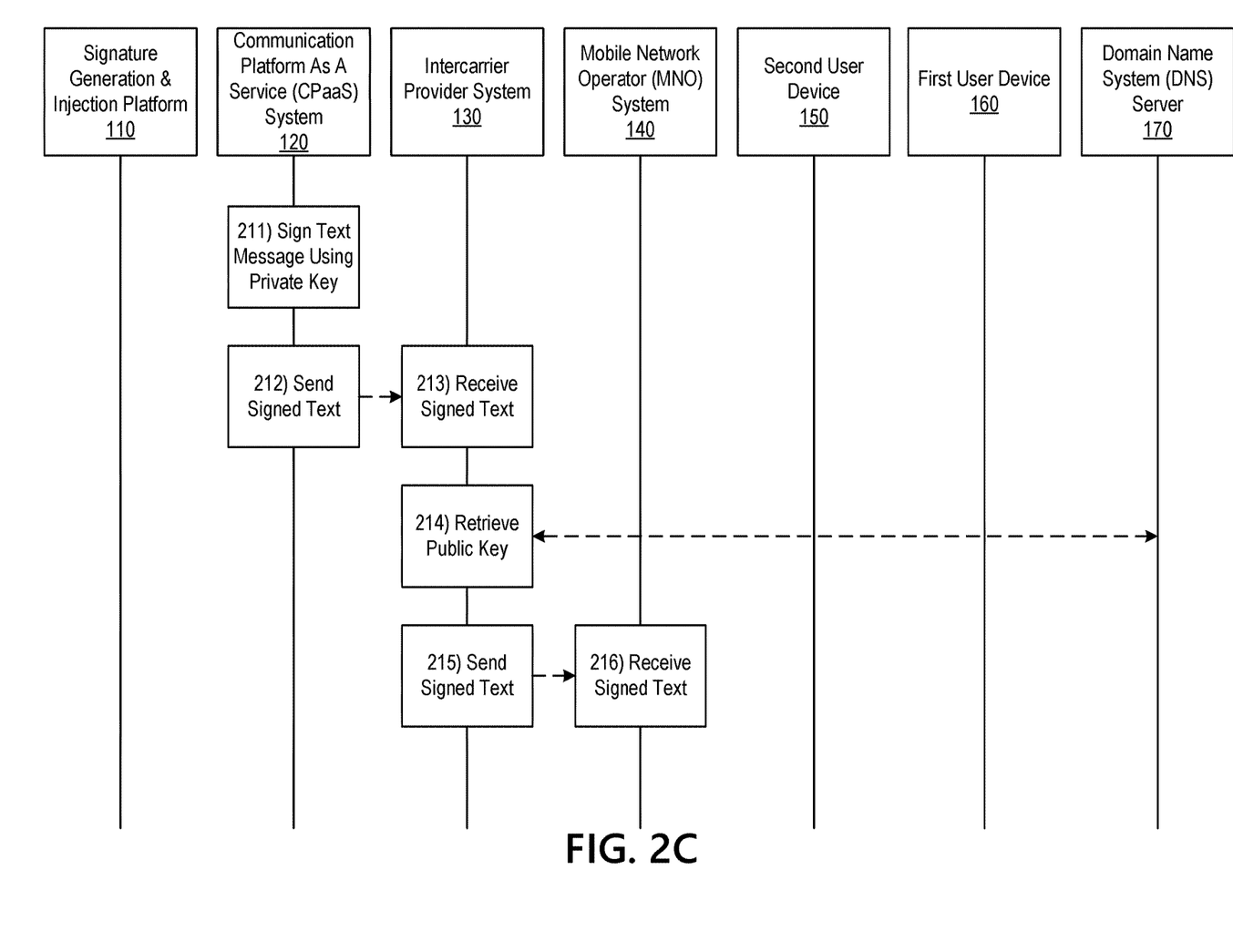

Referring to FIG. 2C, at step 211, the CPaaS system 120 may sign the text message using the received private key. For example, the CPaaS system 120 may sign the text message on behalf of the message originating organization or individual. In some instances, the CPaaS system 120 may sign the text message using a signed token. In some instances, in signing the text message, the CPaaS system 120 may embed or otherwise inject information similar to the information described above at step 206.

At step 212, the CPaaS system 120 may send the signed text message to the intercarrier provider system 130, which may, for example, be a hub configured to route messages between senders and recipients. At step 213, the intercarrier provider system 130 may receive the signed text.

At step 214, the intercarrier provider system 130 may retrieve the public key. For example, the intercarrier provider system 130 may retrieve the public key from the DNS server 170 to which the public key was published. In some instances, the intercarrier provider system 130 may identify a location of the public key (e.g., intercarrier provider system 130) using information embedded in the text message. In doing so, the intercarrier provider system 130 may, in some instances, perform an intermediate validation of the message (e.g., prior to validation of the message by the MNO system 140).

In some instances, the intercarrier provider system 130 may also sign the message using a private/public key pair (which may be a different private/public key pair than was used by the signature generation and injection platform 110 to sign the text message at step 206). In these instances, the intercarrier provider system 130 may send, embed, and/or otherwise publish the public/private keys in a similar manner to that performed by the signature generation and injection platform 110. For example, the intercarrier provider system 130 may further hash the message contents, sender information, and/or other information. In some instances, the intercarrier provider system 130 may embed the private key/signature in the same or a different (e.g., subsequent) field as the private key/signature of the signature generation and injection platform 110 (e.g., a custom SMPP field). As a result, the text message may be a multisigned message (e.g., signed by both the intercarrier provider system 130 and the signature generation and injection platform 110). In some instances, the intercarrier provider system 130 may sign the text message using a signed token.

At step 215, the intercarrier provider system 130 may send the signed text message (which may be a multisigned message) to the MNO system 140. At step 216, the MNO system 140 may receive the signed text message.

Figure 2D:
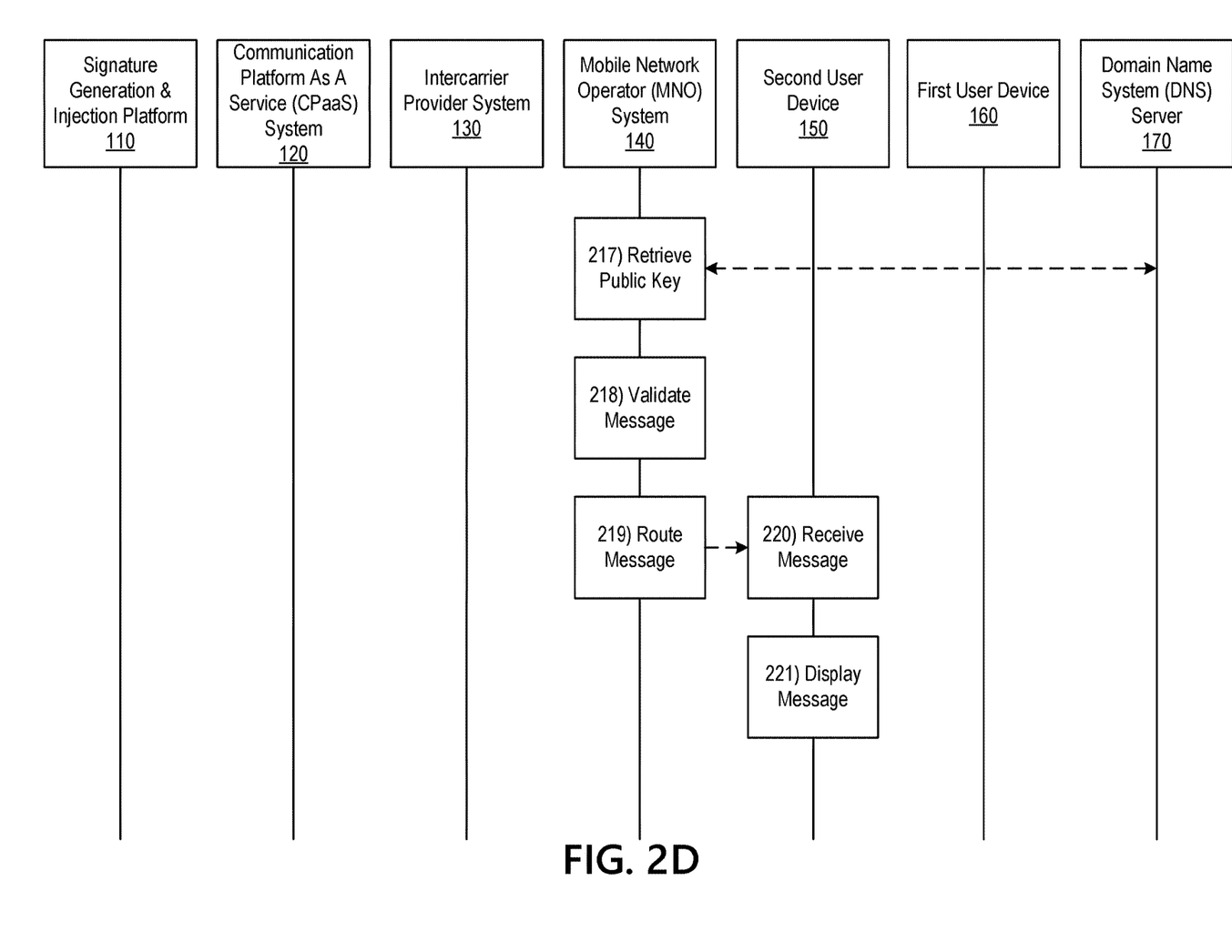

Referring to FIG. 2D, at step 217, the MNO system 140 may retrieve the public key. For example, the intercarrier provider system 130 may retrieve the public key from the DNS server 170 to which the public key was published. In some instances, the MNO system 140 may identify a location of the public key (e.g., DNS server 170) using information embedded in the text message.

At step 218, the MNO system 140 may validate the text message using the public key(s). For example, the MNO system 140 may access the public key based on a location identified in the message metadata. The MNO system 140 may then perform a cryptographic validation using the message contents, embedded hash, and/or other information to verify integrity of the text message. In some instances, the MNO system 140 may also validate a number of hops that the text message passed through since leaving the sender device, a chain of custody, routing information, sender information, and/or other information, which may, e.g., be embedded in the metadata or otherwise included in the text message. If the MNO system 140 successfully validates the text message, it may proceed to step 219. Otherwise, if the MNO system 140 is unable to validate the text message, it may proceed to step 222.

At step 219, the MNO system 140 may route the text message to the second user device 150. For example, after identify that the text message is valid, the MNO system 140 may route the text message to the second user device 150 for display.

At step 220, the second user device 150 may receive the validated text message from the MNO system 140. At step 221, the second user device 150 may display the validated text message, and the event sequence may end.

At step 222, the MNO system 140 may generate ARF feedback. For example, after identifying that the text message was not validated, the MNO system 140 may generate information indicating that the text message was not validated. In some instances, in generating the ARF feedback, the MNO system 140 may generate information indicating that a problem occurred with signature validation and information indicating what the problem was (e.g., because message payload was modified or corrupted in transit, there was an issue with truncation of the message payload during transit, and/or other problems).

At step 223, the MNO system 140 may send the ARF feedback to the signature generation and injection platform 110. At step 224, the signature generation and injection platform 110 may receive the ARF feedback.

Figure 2E:
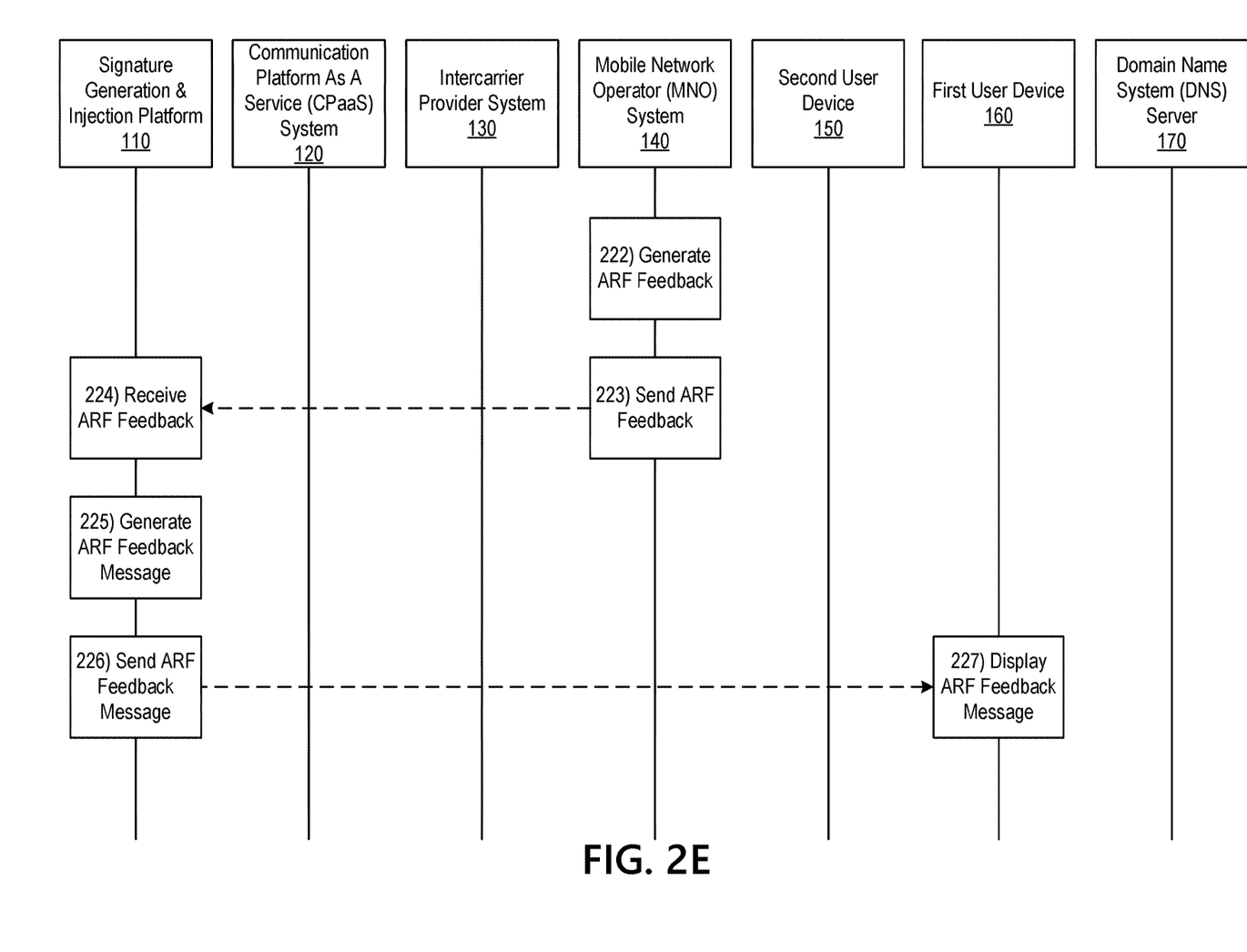

At step 225, the signature generation and injection platform 110 may generate an ARF feedback message. For example, the signature generation and injection platform 110 may generate a message configured for display at a user device (e.g., first user device 160) indicating that the text message was not validated. In some instances, in generating the ARF feedback message, the signature generation and injection platform 110 may include the identified problem in message validation.

Additionally or alternatively, the signature generation and injection platform 110 may publish a policy of how downstream devices (such as MNO system 140) should handle message that cannot be validated. For example, the signature generation and injection platform 110 may publish a policy indicating that such messages should be delivered with a warning, quarantined, sent in a digest, dropped, and/or otherwise subjected to a different policy action. In these instances, such policies may cause the MNO system 140 to act accordingly. In some instances, this policy may be selected or otherwise specified by the message sender. Accordingly, the policy may be accessed for subsequent invalid messages from the sender, and action may be taken accordingly.

In some instances, the signature generation and injection platform 110 may establish trust policies (e.g., positive or negative trust, or various numeric trust scores) for various senders based on results of signature validation. For example, the signature generation and injection platform 110 may identify a number of validated messages for a particular sender and divide that number by a total number of sent messages from the particular sender to compute a likelihood of validation score. The signature generation and injection platform 110 may then compare that score to various trust thresholds, and set policies accordingly. For example, if the likelihood of validation score exceeds a first threshold, future messages from the particular sender may be trusted (without necessarily going through the signature validation process described above), whereas if the likelihood of validation score does not exceed the first threshold, future messages from the particular sender might not be trusted (again, without necessarily going through the signature validation process described above).

In some instances, multiple thresholds may be implemented, each with their own corresponding policies (e.g., no feedback requested, feedback requested for broken signatures only, feedback requested for broken signatures and content blocks, and/or other policies). Additionally or alternatively, reporting rates may be set based on these thresholds (e.g., a more trustworthy sender may be associated with a lower reporting rate, and vice versa).

In doing so, an efficient screening process may be implemented for messages. In these instances, the likelihood of validation scores may be periodically updated for senders so as to account for changes in message trustworthiness for various senders.

Once such policies are identified, the signatures (as described above) may include information such as an ARF feedback code (which may, e.g., indicate what feedback is requested), a reporting rate (which may, e.g., indicate a percentage of messages to sample), a reporting address (which may, e.g., indicate a destination to send reporting feedback), an indication of the signing entity, a message hash, and/or other information. This information may accessed by the MNO system 140 for subsequent messages, and may be used to perform future validation/reporting of messages.

Figure 4:
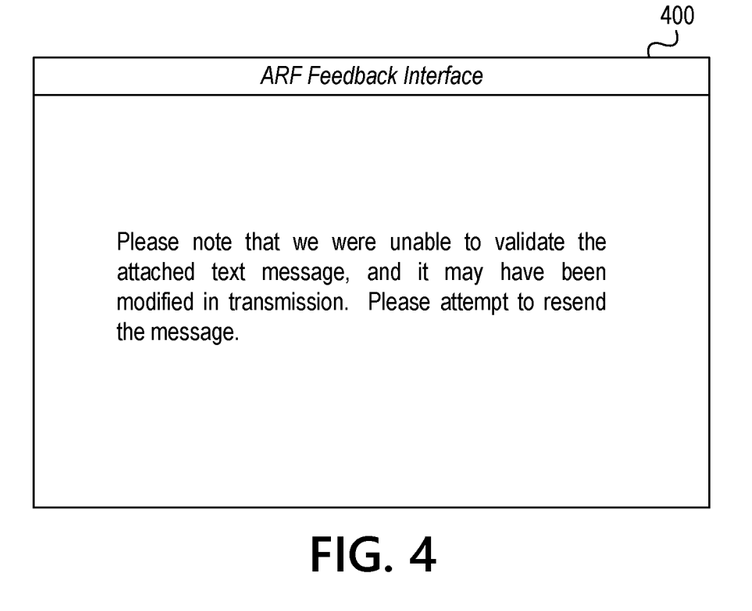
FIG. 4 depicts an illustrative user interface for using signed tokens to verify SMS message bodies in accordance with one or more example embodiments.

At step 226, the signature generation and injection platform 110 may send the ARF feedback message to the first user device 160. At step 227, the first user device 160 may receive and display the ARF feedback message. For example, in displaying the ARF feedback message, the first user device 160 may display a graphical user interface similar to graphical user interface 400, which is shown in FIG. 4.

The steps described in the illustrative event sequence herein may be performed in any alternative sequence or order without departing from the scope of the disclosure. Furthermore, although the above described systems, event sequence, and methods are described primarily in the context of text messages, this is solely for illustrative purposes, and the systems, event sequence, and methods described herein may be applied in other contexts without departing from the scope of the disclosure.

Figure 3:
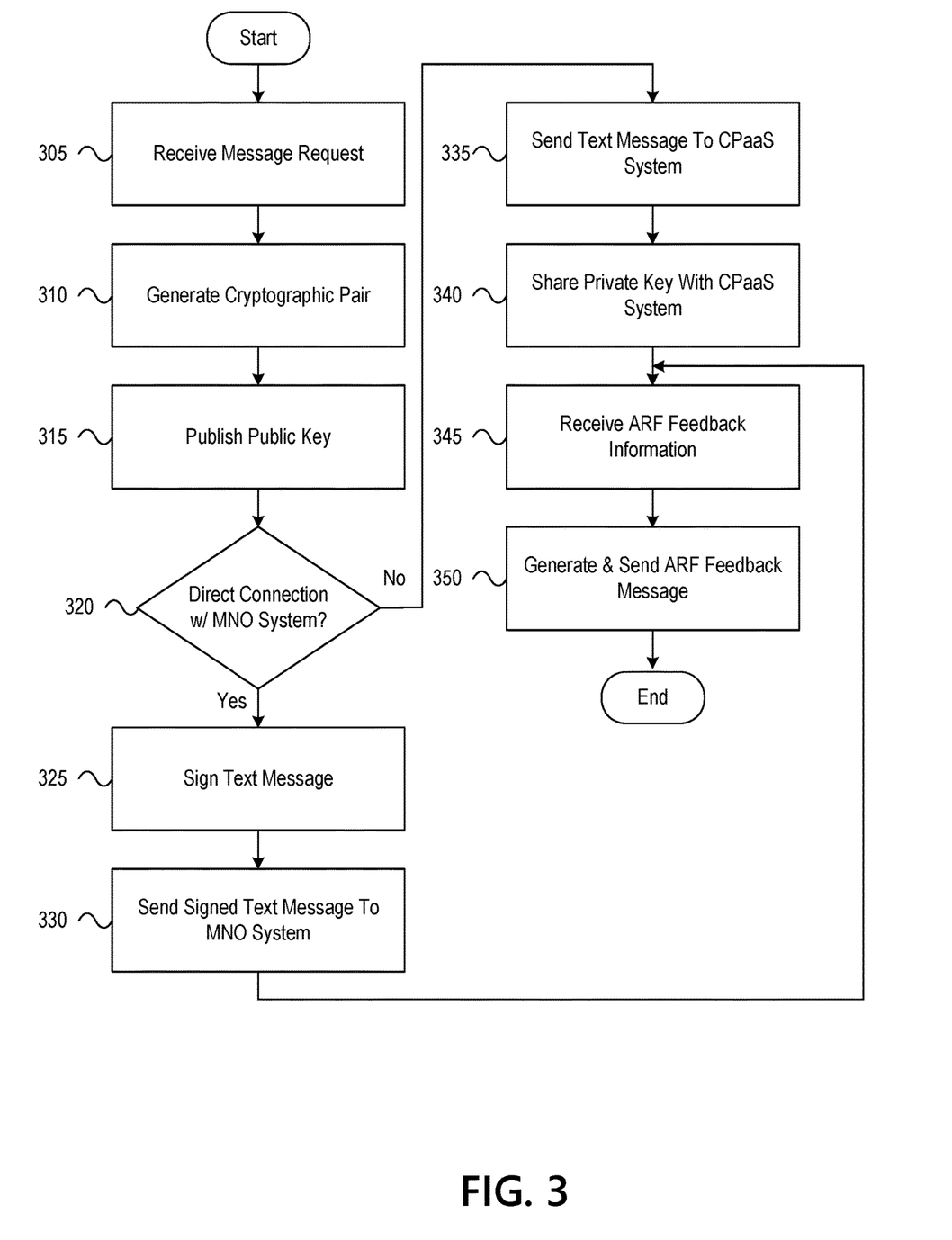
FIG. 3 depicts an illustrative method for using signed tokens to verify SMS message bodies in accordance with one or more example embodiments.

FIG. 3 depicts an illustrative method for using signed tokens to verify SMS message bodies in accordance with one or more example embodiments. Referring to FIG. 3, at step 305, a computing platform having at least one processor, a communication interface, and memory may receive a message sent request. At step 310, the computing platform may generate a cryptographic pair, including a private/signing key and a public key. At step 315, the computing platform may publish the public key. At step 320, the computing platform may identify whether a direct connection is established with the MNO system. If there is not a direct connection with the MNO system, the computing platform may proceed to step 335. If there is a direct connection with the MNO system, the computing platform may proceed to step 325.

At step 325, the computing platform may sign the text message. At step 330, the computing platform may send the signed text message to the MNO system, and proceed to step 345.

Returning to step 320, if there is not a direct connection with the MNO system, the computing platform may proceed to step 335 to send the text message to the CPaaS system. At step 340, the computing platform may share the private key with the CPaaS system. At step 345, the computing platform may receive ARF feedback information. At step 350, the computing platform may generate and send an ARF feedback message to a user device for display.

It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   generate a cryptographic key pair comprising a public key and a private key;
   publish, to a server, the public key; generate a short message service (SMS) message;
   sign, using the private key, the SMS message, wherein signing the SMS message comprises computing a cryptographic hash of the SMS message using the private key and embedding the cryptographic hash in a short message peer-to-peer (SMPP) field of the SMS message; and
   send, to a downstream computing system, the signed SMS message, wherein the downstream computing system is configured to validate the signed SMS message using the cryptographic hash embedded in the SMPP field of the SMS message and by accessing the public key from an internet Domain Name Service (DNS) server of a domain indicated by the computing platform.

2. The computing platform of claim 1, wherein signing the SMS message causes message metadata to indicate retrieval information for the public key.

3. The computing platform of claim 1, wherein the server comprises a DNS server.

4. The computing platform of claim 1, wherein the memory stores additional computer-readable instructions that, when executed by the at least one processor, cause the computing platform to perform one or more of:
   store, at the computing platform, the private key, or
   upload, to a Communications Platform as a Service (CPaaS) platform, the private key, wherein the private key is stored at the CPaaS platform.

5. The computing platform of claim 4, wherein signing the SMS message comprises signing the SMS message at one of: the computing platform or the CPaaS platform.

6. The computing platform of claim 1, wherein computing the cryptographic hash of the SMS message comprises hashing one or more of: contents of the SMS message and sender information.

7. The computing platform of claim 1, wherein the SMPP field comprises a custom SMPP tagged link value (TLV).

8. The computing platform of claim 1, where the SMS message is additionally signed by an upstream intercarrier computing system using another public-private key combination, and wherein the downstream computing system further verifies the complete SMS message based on the upstream intercarrier computing system's signature.

9. The computing platform of claim 1, wherein the memory stores additional computer-readable instructions that, when executed by the at least one processor, cause the computing platform to:
   receive, from the downstream computing system, a message indicating that a problem occurred with signature validation for the SMS message.

10. The computing platform of claim 9, wherein the message indicating that a problem occurred with signature validation for the SMS message may indicate that the problem comprises one or more of: a message payload modification, a message payload corruption, or an issue with truncation of payload for the SMS message during transit.

11. The computing platform of claim 9, wherein the memory stores additional computer-readable instructions that, when executed by the at least one processor, cause the computing platform to:
   generate, based on receipt of the message indicating that the problem occurred with signature validation for the SMS message, an abuse reporting format (ARF) message, wherein the ARF message includes one or more policies indicating how downstream computing systems, including the downstream computing system, should handle messages that are unable to be validated.

12. The computing platform of claim 11, wherein generating the ARF message causes the computing platform to instruct the downstream computing systems to: deliver the invalid messages with a warning, quarantine the invalid messages, send the invalid message in a digest, or drop the invalid message.

13. A method comprising:
   at a computing platform comprising at least one processor, a communication interface, and memory:
   generating a cryptographic key pair comprising a public key and a private key;
   publishing, to a server, the public key;
   generating a short message service (SMS) message;
   signing, using the private key, the SMS message, wherein signing the SMS message comprises computing a cryptographic hash of the SMS message using the private key and embedding the cryptographic hash in an SMPP field of the SMS message; and
   sending, to a downstream computing system, the signed SMS message, wherein the downstream computing system is configured to validate the signed SMS message using the cryptographic hash embedded in the SMPP field of the SMS message and by accessing the public key from an internet Domain Name Service (DNS) server of a domain indicated by the computing platform.

14. The method of claim 13, wherein signing the SMS message causes message metadata to indicate retrieval information for the public key.

15. The method of claim 13, wherein the server comprises a DNS server.

16. The method of claim 13, further comprising performing one or more of:
storing, at the computing platform, the private key, or
uploading, to a Communications Platform as a Service (CPaaS) platform, the private key, wherein the private key is stored at the CPaaS platform.

17. The method of claim 16, wherein signing the SMS message comprises signing the SMS message at one of: the computing platform or the CPaaS platform.

18. The method of claim 13, wherein computing the cryptographic hash of the SMS message comprises hashing one or more of: contents of the SMS message and sender information.

19. The method of claim 13, wherein the SMPP field comprises a custom SMPP tagged link value (TLV).

20. One or more non-transitory computer-readable media storing instructions that, when executed by a computing platform comprising at least one processor, a communication interface, and memory, cause the computing platform to:
generate a cryptographic key pair comprising a public key and a private key;
publish, to a server, the public key;
generate a short message service (SMS) message;
sign, using the private key, the SMS message, wherein signing the SMS message comprises computing a cryptographic hash of the SMS message using the private key and embedding the cryptographic hash in an SMPP field of the SMS message; and
send, to a downstream computing system, the signed SMS message, wherein the downstream computing system is configured to validate the signed SMS message using the cryptographic hash embedded in the SMPP field of the SMS message and by accessing the public key from an internet Domain Name Service (DNS) server of a domain indicated by the computing platform.

* * * * *

UNITED STATES PATENT AND TRADEMARK OFFICE
CERTIFICATE OF CORRECTION

| | | |
|---|---|---|
| PATENT NO. | : 11,811,932 B2 | Page 1 of 1 |
| APPLICATION NO. | : 17/491771 | |
| DATED | : November 7, 2023 | |
| INVENTOR(S) | : Lee et al. | |

It is certified that error appears in the above-identified patent and that said Letters Patent is hereby corrected as shown below:

In the Claims

Column 11, Line 36:
In Claim 1, after "key;", insert --¶--

Signed and Sealed this
Twenty-sixth Day of March, 2024

*Katherine Kelly Vidal*

Katherine Kelly Vidal
*Director of the United States Patent and Trademark Office*